(12) United States Patent
Huang

(10) Patent No.: US 6,659,234 B1
(45) Date of Patent: Dec. 9, 2003

(54) DISK-TYPE BRAKE DEVICE

(76) Inventor: Tan-Cheng Huang, 6Fl., No. 2-1, Swei St., Taichung (TW)

(*) Notice: Subject to any disclaimer, the term of this patent is extended or adjusted under 35 U.S.C. 154(b) by 0 days.

(21) Appl. No.: 10/287,267

(22) Filed: Nov. 4, 2002

(51) Int. Cl.[7] .................................................. B62L 5/00
(52) U.S. Cl. ........................................................ 188/26
(58) Field of Search ............................... 188/17, 18 A, 188/18 R, 26, 218 XL

(56) References Cited

U.S. PATENT DOCUMENTS 6,148,964 A * 11/2000 Huang ........................ 188/26
6,425,464 B2 * 7/2002 Lumpkin et al. ......... 188/24.12
6,520,297 B1 * 2/2003 Lumpkin et al. ............. 188/26

* cited by examiner

Primary Examiner—Christopher P. Schwartz
(74) Attorney, Agent, or Firm—Charles E. Baxley

(57) ABSTRACT

An anti-lock braking system for bicycle connected to the chain stays and the front forks is cooperated with a disk. The characteristics of the brake system is that when the bicycle is stopped at high speed and an initial force is generated, when the initial force is larger than the spring forces in the brake system, the system generates a buffers the initial force so as to prevent the disk from being clamped overly. Therefore, the bicycle is under controlled when it brakes at high speed.

6 Claims, 9 Drawing Sheets

# DISK-TYPE BRAKE DEVICE

FIELD OF THE INVENTION

The present invention relates to an anti-lock braking system (A.B.S.) for bicycle so as to buffer the initial force when the bicycle is stopped at high speed.

BACKGROUND OF THE INVENTION

A conventional disk brake system for bicycle is shown in FIG. 1 and generally includes an arm 1, a clamp device 2 and a cable 3. The disk type brake system has several benefits such as stable, brake precisely, good heat dispensing and can be used for a long period of time. Nevertheless, when the bicycle brakes at high speed, because the disk is clamped firmly so that the initial force of the bicycle pushes the bicycle forward still and the bicycle could shake or even the rider falls down from the bicycle.

The present invention intends to provide a disk type brake system wherein the initial force can be absorbed by deformation of springs and the disk can be loosened for only a very short period of time and is then clamped again.

SUMMARY OF THE INVENTION

The primary object of the present invention is to provide an anti-lock braking system for bicycle such that the initial force of the bicycle can be buffered.

Another object of the present invention is to provide an anti lock braking system for bicycle wherein the structure of the brake system is mechanical constructed and simple.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 1 is an exploded view to show the brake system of the present invention;

DETAILED DESCRIPTION OF THE PREFERRED EMBODIMENT

Figure 1:
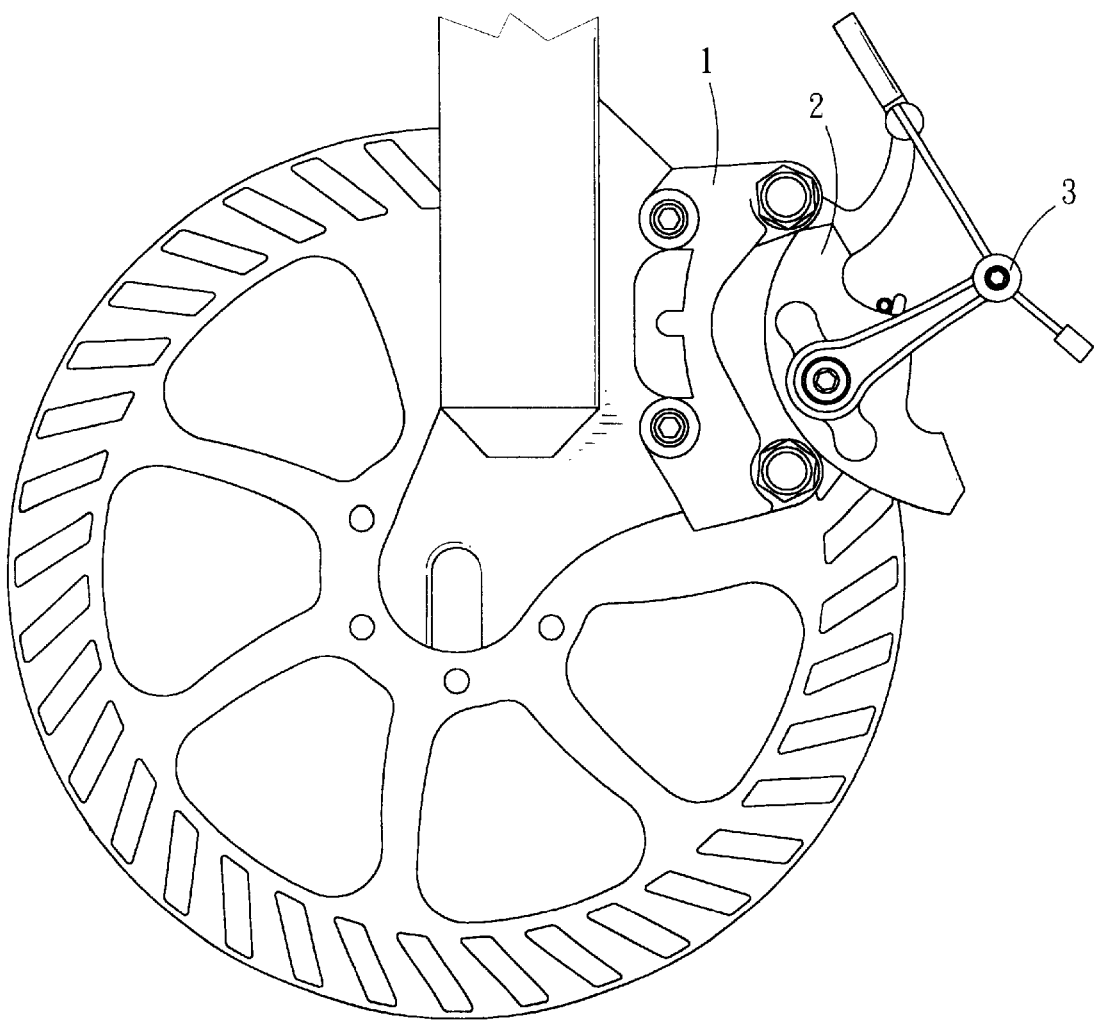
FIG. 1 is a plan view to show the conventional disk type brake system.
Figure 2:
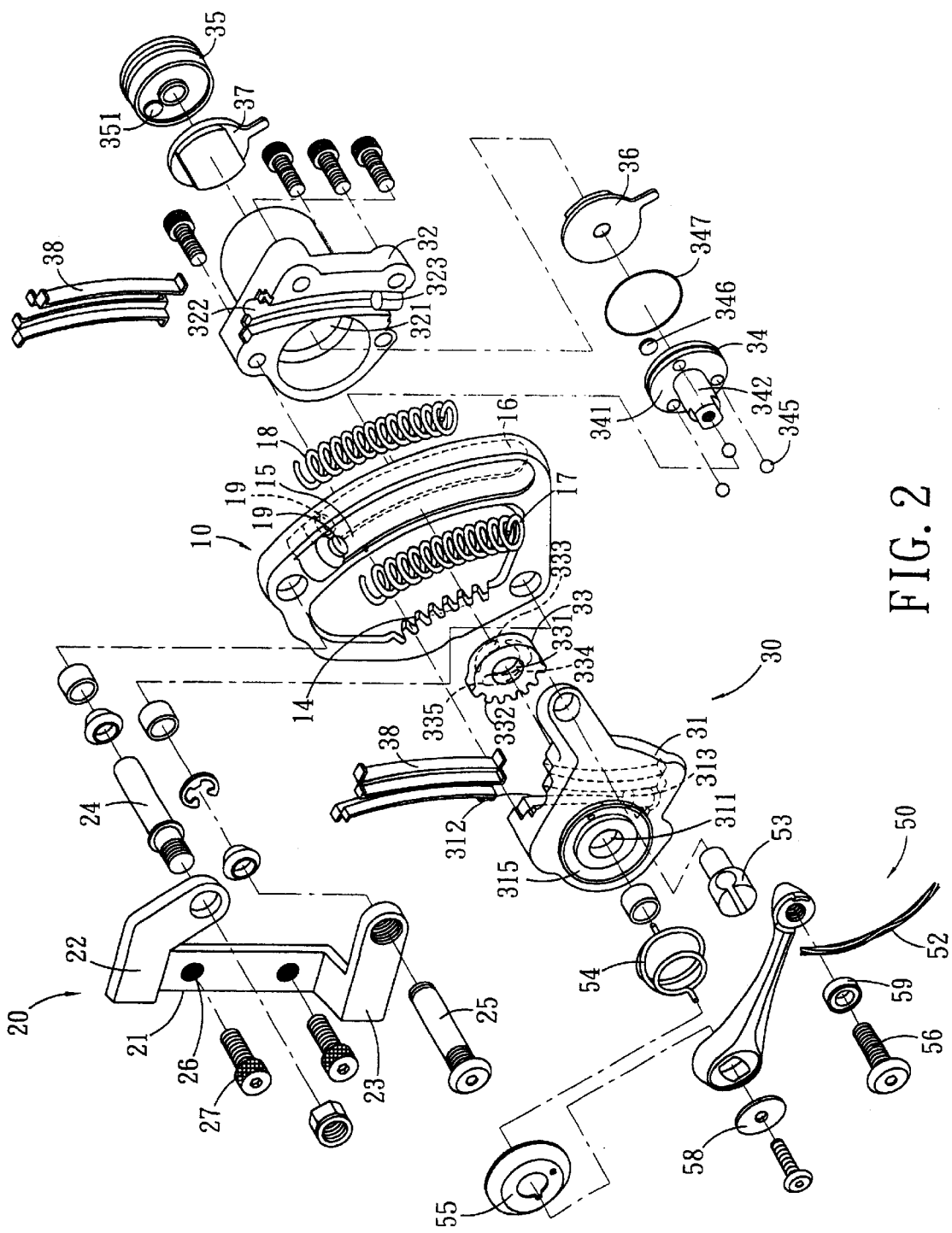
Figure 3:
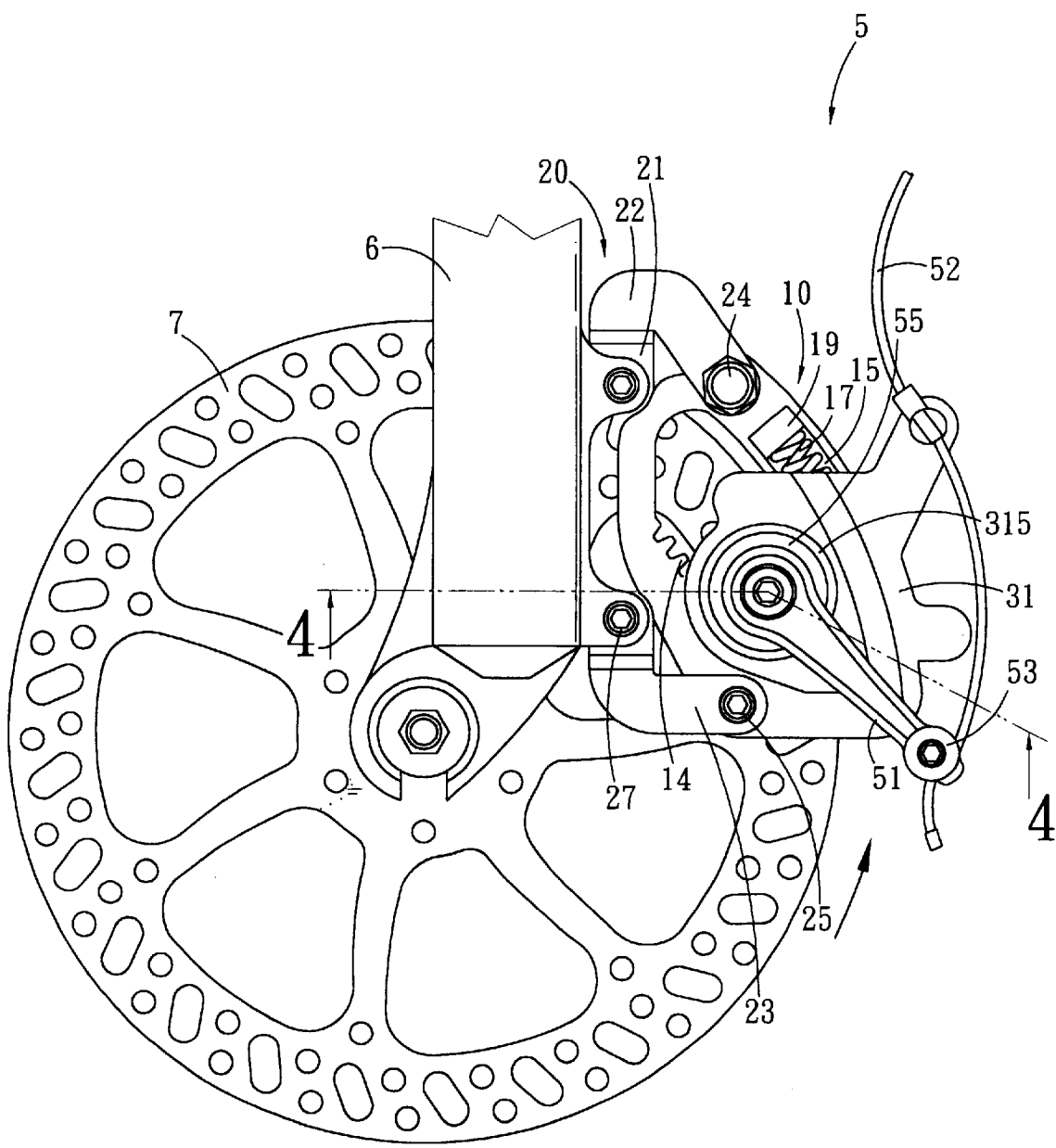
FIG. 3 is a plan view to show the brake system of the present invention.
Figure 4:
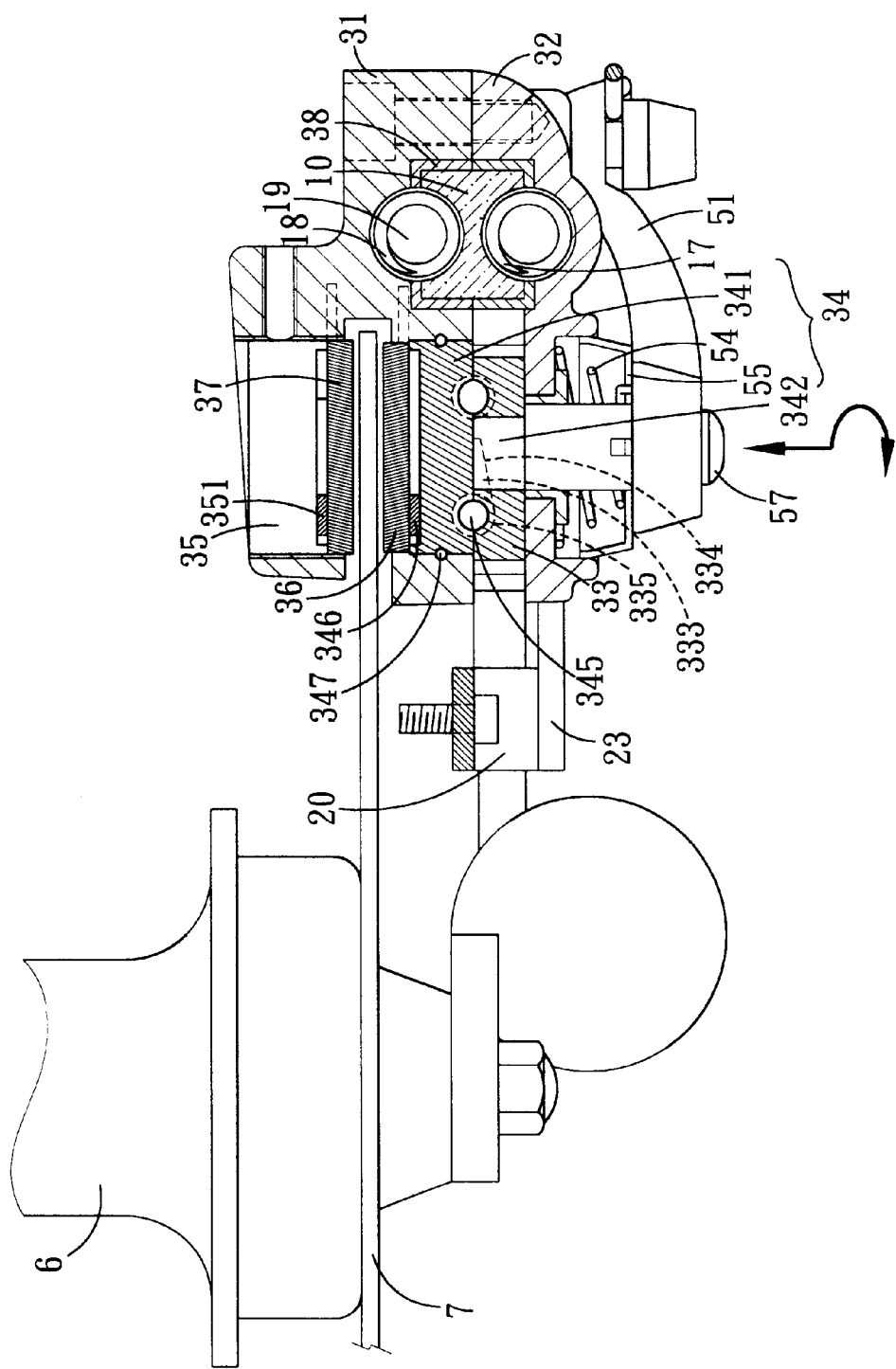
FIG. 4 is a cross sectional view along the cutting line 4—4.

Referring to FIGS. 2 to 4, the brake system 5 of the present invention is connected to the chain stay or fort fork 6 of the bicycle and is cooperated with a disk 7. The brake system comprises a main frame 10, a fixing frame 20 and a brake mechanism 30.

The main frame 10 is located at a side of the disk 7 and has a teethed inside 14. Two grooves 15, 16 are defined in two sides of the main frame 10 and two springs 17, 18 are received in the two grooves 15, 16. The two grooves 15, 16 each have a protrusion 19 such that an end of the spring 17/18 is engaged.

The fixing frame 20 includes a main portion 21 and two connection portions which are an upper connection portion 22 at one end and a lower connection portion 23 at the other end. The upper connection portion 22 is connected to the main frame 10 by an adjusting rod 24. The lower connection portion 23 is connected to the main frame 10 by another adjusting rod 25. Two threaded holes 26 are defined through the main portion 21 of the fixing frame 20 so that the fixing frame 20 is fixed to the chain stay or front fork 6 by bolts 27.

The brake mechanism 30 is located onto the disk 7 and cooperated with the main frame 10 and the fixing frame 20. The mechanism 30 includes a first brake arm 31, a second brake arms 32, a toothed cam 33, a main shaft 34, a cap 35, a first lining plate 36, a second lining plate 37 and a brake cable set 50.

The first brake arm 31 and the second brake arm 32 are located on two sides of the disk 7. A first hole 311 is defined in a predetermined location of the first brake arm 31 and a second hole 321 is defined in a predetermined location of the second brake arm 32. A recess 312/322 is defined in a facing side of first brake arm 31 and the second brake arm 32. A protrusion 313/323 extends from an inside of each of the recesses 312, 322 so that the other end of each of the two springs 17, 18 is engaged. Two lining strips 38 are received in each of the recesses 312, 322. A recessed area 315 is defined in the side located in opposite to the side having the recess 312 in the first brake arm 31.

The toothed cam 33 is located between the disk 7 and the first brake arm 31. The toothed cam 33 has a central hole 331 and a plurality of teeth 332 so as to be engaged with the toothed inside 14 of the main frame 10. The side facing the disk 7 of the toothed cam 33 has a plurality of tear-shaped notches 333 and each of the notches 333 includes a shallow end 334 and a deep end 335.

The main shaft 34 is located between the disk 7 and the toothed cam 33, and includes a plate portion 31 and a shaft 342 which extends from a side of the plate portion 31 and towards the first brake arm 31. The shaft 342 extends through the central hole 331 in the toothed cam 33 and the first hole 311 in the first brake arm 31. The plate portion 31 of the main shaft 34 has a plurality of beads 345 which are received in the tear-shaped notches 333. A magnet 346 and an O-ring 347 are connected to the other side of the plate portion 341.

The cap 35 is located between the disk 7 and the second brake arm 32, and received in the second hole 321 of the second brake arm 32. A side facing the disk 7 of the cap 35 has a magnet 351.

The first lining plate 36 and the second lining plate 37 are located on two sides of the disk 7. The. first lining plate 36 is located between the disk 7 and the main shaft 34, and is located on the side of the plate portion 341 so as to be attracted by the magnet 346. The second lining plate 37 is located between the cap 35 and the disk 7. The second lining plate 37 is located on the side of the cap 36 such that it is attracted by the magnet 351.

The brake cable set 50 is engaged with the recessed area 315 of the first brake arm 31 and includes an arm 51, a brake cable 52, a base 53, a spring 54 and a cap 55. The brake cable set 50 is well known in the art and will not be described in detailed.

Figure 5:
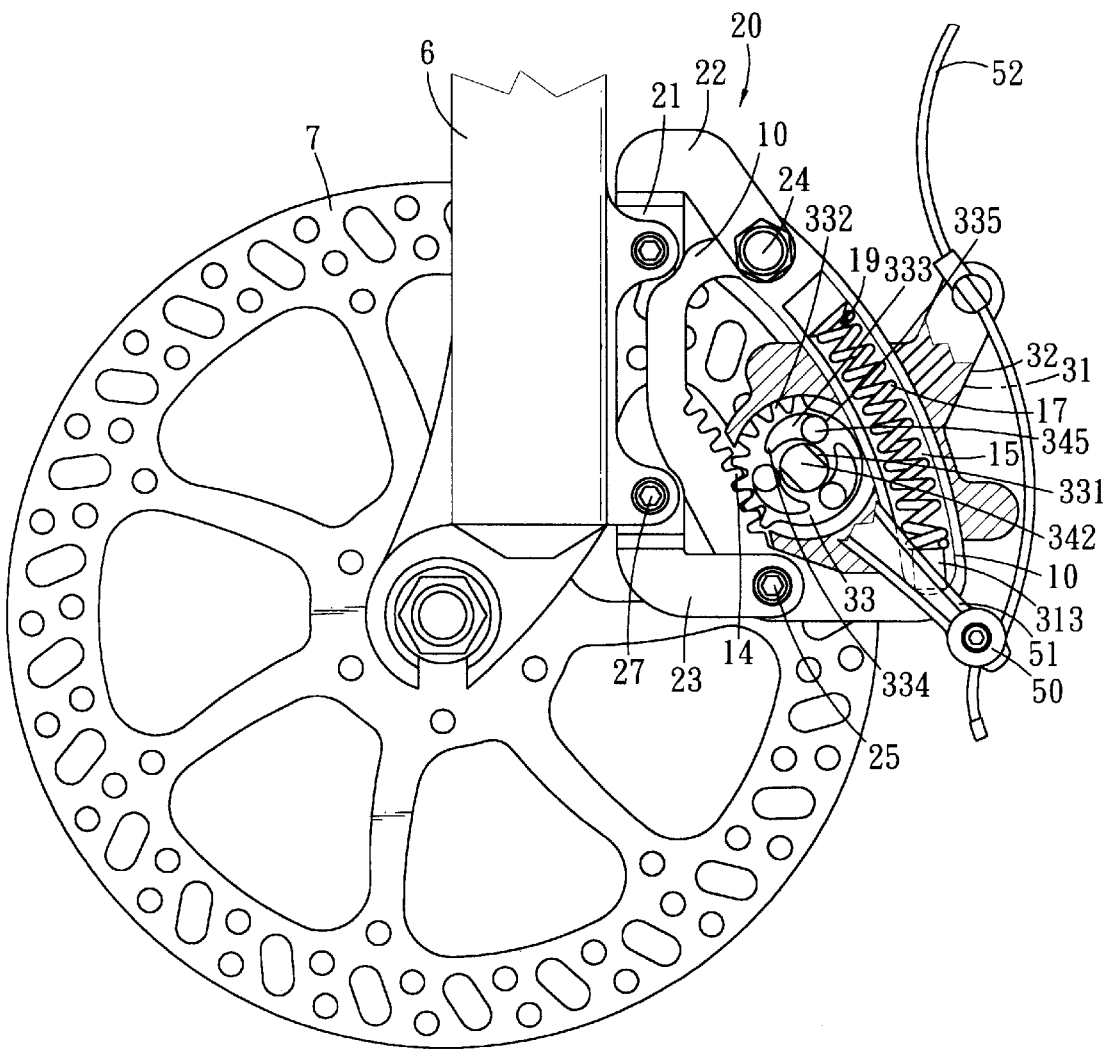
FIG. 5 shows that the brake system of the present invention is not operated.
Figure 6:
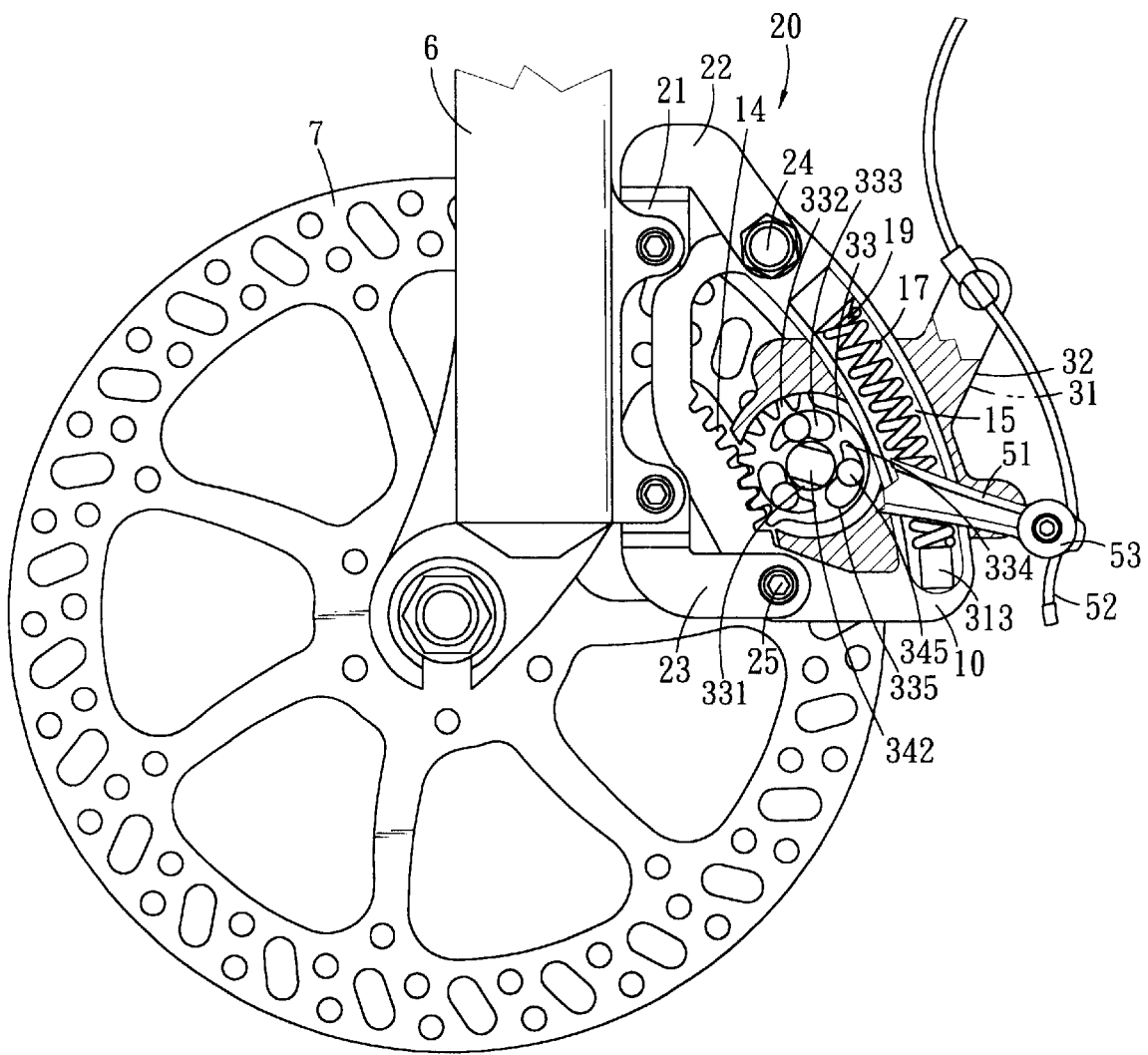
FIG. 6 shows that the brake system of the present invention is operated.

Referring to FIGS. 5 to 8, when the bicycle brakes at a high speed, the arm 51 of the brake cable set 50 is connected to the main shaft 34 of the brake mechanism 30 and rotated counter clockwise. The beads 345 of the main shaft 34 are moved from the deep ends 335 in the tear-shaped notches 333 to the shallow ends 334. The beads 345 then protrude the main shaft 34 and toward the disk 7. The first and second lining plates 36, 37 firmly clamp the disk 7 and the brake mechanism 30 and the main frame 10 are proceeding braking process on the fixing frame 20 as shown in FIGS. 5 and 6.

Figure 7:
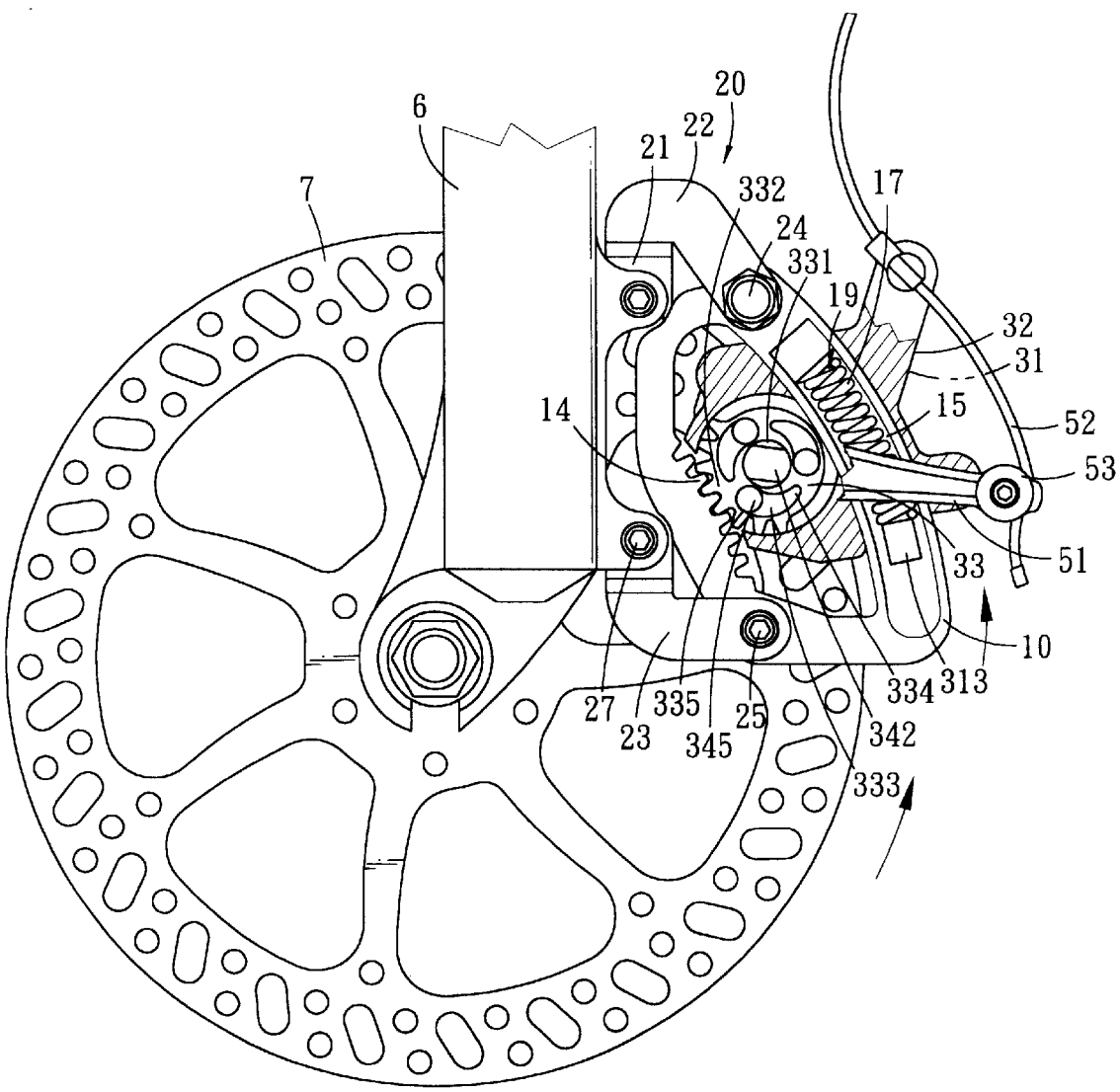
FIGS. 7 and 8 show the disk is loosened and clamped within a short period of time.

If an initial force of the high speed bicycle is larger than the forces of the springs 17, 18 in the main frame 10, the brake system 5 proceeds a buffer action to prevent the disk 7 from being clamped overly by the brake system 5. The initial force drives the brake mechanism 30 to move along the grooves 15, 16 of the main frame 10, and the projections 313, 323 of the two brake arms 31, 32 compress the springs 17, 18. At this moment, the teeth 332 of the toothed cam 33 are engaged with the toothed inside 14 of the main frame 10, so that the toothed cam 33 is rotated counter clockwise. The tear-shaped notches 333 are shifted with the toothed can 33 and the beads 345 are moved back to the deep ends 335. The main shaft 34 is not urged by the beads 345 and two lining plates 36, 37 are released suddenly as shown in FIG. 7.

Figure 8:
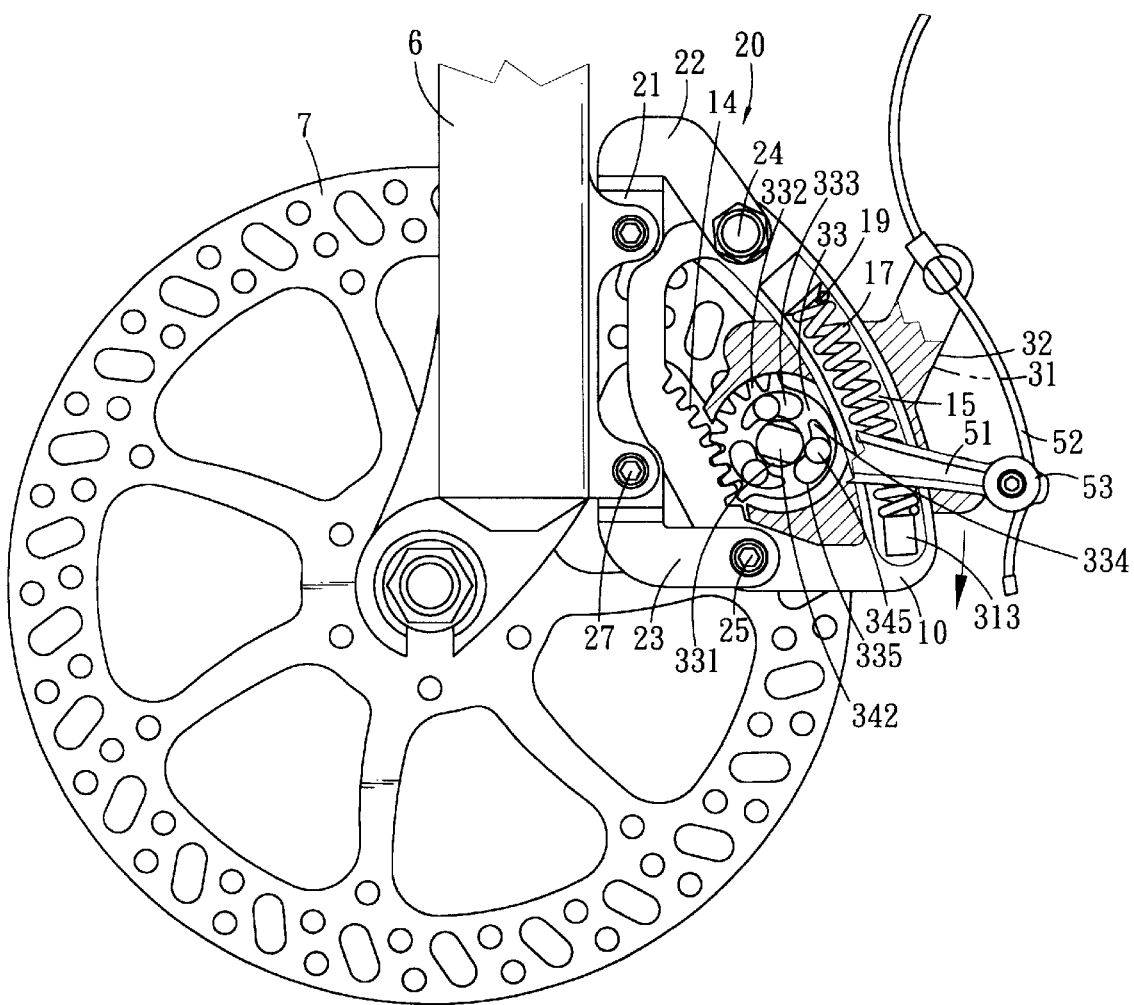

After a very short period of time such as five thousandth seconds, the initial force is less than the forces of the springs 17, 18, the brake mechanism 30 pushes the mechanism 30 to its original position along the grooves 15, 16 in the main frame 10. The toothed cam 33 is rotated clockwise and the tear-shaped notches 334 are rotated with the toothed cam 33 and the beads 345 move from the deep ends 335 to the shallow ends 333 to drive the main shaft 34, and the two lining plates 36, 37 clamp the disks 7 firmly again as shown in FIG. 8. By the arrangement, the disk 7 is not clamped overly by the lining plates 36, 37 and the affection by the initial force to the bicycle can be reduced.

Figure 9:
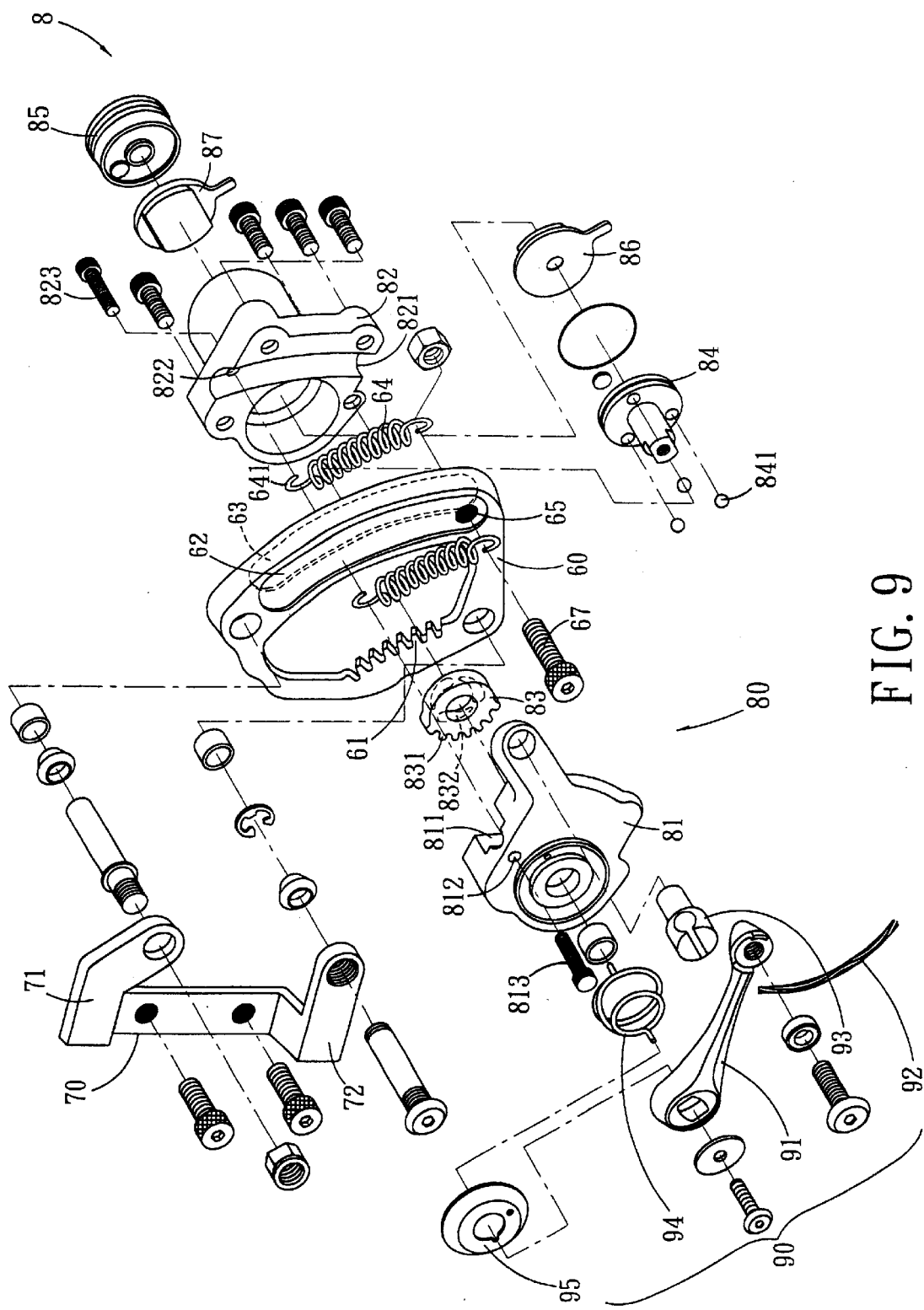
FIG. 9 shows an exploded view of another embodiment of the brake system of the present invention.

Referring to FIG. 9, another preferred embodiment of brake system 98 is shown and includes a main frame 60 located at a side of the disk 7 and has a toothed inside 61. Two grooves 62, 63 are defined in two sides of the main frame 60 and each have a spring 64 received therein.

A fixing frame 70 is connected to the chain stay or front fork 6 of the bicycle, and has two connection portions 71, 72 so as to be connected to the main frame 60.

A brake mechanism 80 is operatively connected to the main frame 60 ad the fixing frame 70, and includes two brake arms 81, 82 which are located on two sides of the disk 7. Each brake arm 81/82 has a recess 811/812 on the facing side and located corresponding to the grooves 62, 63 of the main frame 60. A toothed cam 83 is located between the disk 7 and the brake arm 81. A plurality of teeth 831 are defined in the cam 83 so as to be engaged with the toothed inside 61 of the main frame 60. A plurality of tear-shaped notches 832 are defined in the toothed cam 83. A main shaft 84 is located between the disk 7 and the toothed cam 83, and includes beads 841 so as to be received in the notches 832. A cap 85 is located between the disk 7 and the brake arm 82. Two lining plates 86, 87 are located on two sides of the disk 7 and located between the cap 85 and the main shaft 84. A brake cable set 90 is connected to the brake arm 81 and includes an arm 91, a brake cable 92, a base 93, a spring 94 and a dust cap 95.

The relationship between parts of the above mentioned preferable embodiment is similar to the brake mechanism 5 described relative to FIGS. 2 to 8, and will not be described in detailed here. The difference is that the grooves 62, 63 in the main frame 60 has a threaded hole 65 for a bolt 67 threadedly engaged. The two brake arms 81, 82 each have holes 812, 822 at predetermined positions so that bolts 813, 823 may extend. The springs 64 in the grooves 62, 63 each have hooks 641 at two ends thereof so that the hooks 641 on one end may hook on the bolt 67 and the hooks on the other end are hooked to the holes 812, 822 in the brake arms 81, 82. By this arrangement, the brake mechanism 8 performs the same as the mechanism 5 mentioned above.

The brake mechanism has anti-lock braking feature to prevent the disk from being clamped overly by the operation of the toothed cam to release the beads to loosen the main shaft such that the lining plates release the disk. After the initial force is less than the forces of the springs, the brake mechanism is activated again to clamp the disk again. The brake feature is ensured and increases the safety of the rider. The mechanism is a mechanical arrangement which needs no complicated control devices and lines arrangements and can be done at low cost.

While we have shown and described the embodiment in accordance with the present invention, it should be clear to those skilled in the art that further embodiments may be made without departing from the scope of the present invention.

What is claimed is:

1. A brake system connected to the chain stays and the front fork of bicycle, comprising:

a main frame located on a side of a disk and having a toothed inside, two grooves defined in two sides of the main frame and two springs received in the two grooves;

a fixing frame having a main portion adapted to be connected to the chain stays and the front fork, two connection portions connected to two ends of the main portion so as to be connected to the main frame;

a brake mechanism connection to the disk and cooperated with the main frame and the fixing frame, the brake mechanism comprising two brake arms located on two sides of the disk, each brake arm having a recess located corresponding to the grooves in the main frame;

a toothed cam located one of the two brake arms and the disk, a plurality of teeth defined in the toothed cam and engaged with the toothed inside of the main frame, a plurality of tear-shaped notches each of which includes a shallow end and a deep end;

a main shaft located between the disk and the toothed cam and having a plurality of beads which are received in the tear-shaped notches;

a cap located between the other brake arm and the disk;

two lining plates located on two sides of the disk and between the cap and the main shaft, and a brake cable set connected to one of the two brake arms.

2. The system as claimed in claim 1, wherein each of the grooves in the main frame has a protrusion so as to be engaged with an end of the spring received therein, each of the recesses in each of the two brake arms has another protrusion which is engaged with the other end of the spring received therein, each of the two recesses having a plurality of lining strips received therein.

3. The system claimed in claim 1, wherein the main frame has threaded holes for bolts extending therethrough and the two brake arms each have holes for bolts extending therethrough, the springs in the grooves in the main frame each have hooks on two ends thereof, the hook on one end of each of the springs engaged with the bolt extending through the threaded holes and the hook on the other end of each of the springs engaged with the bolts extending through the holes in the brake arms.

4. The system as claimed in claim 1, wherein the main portion has an upper connection portion on an end thereof and an adjusting rod extends through the upper connection portion and is connected to the main frame, a lower connection portion connected to the other end of the main portion and an adjusting rod extending through the lower connection portion and connected to the main frame.

5. The system as claimed in claim 1, wherein the toothed cam has a central hole defined therethrough and a plurality of tear-shaped notches defined in a side of the toothed cam, the tear-shaped notches facing the disk, each tear-shaped notch having a shallow end and a deep end.

6. The system as claimed in claim 1, wherein the main shaft includes a plate portion and a shaft extends from a side of the plate portion and towards one of the brake arms, a plurality of beads located at the side from which the shaft extends and received in the tear-shaped notches.

* * * * *